Nov. 24, 1959  H. KLAUE  2,914,142
DISC BRAKES, PARTICULARLY FOR MOTOR VEHICLES
Filed April 24, 1957  5 Sheets-Sheet 2

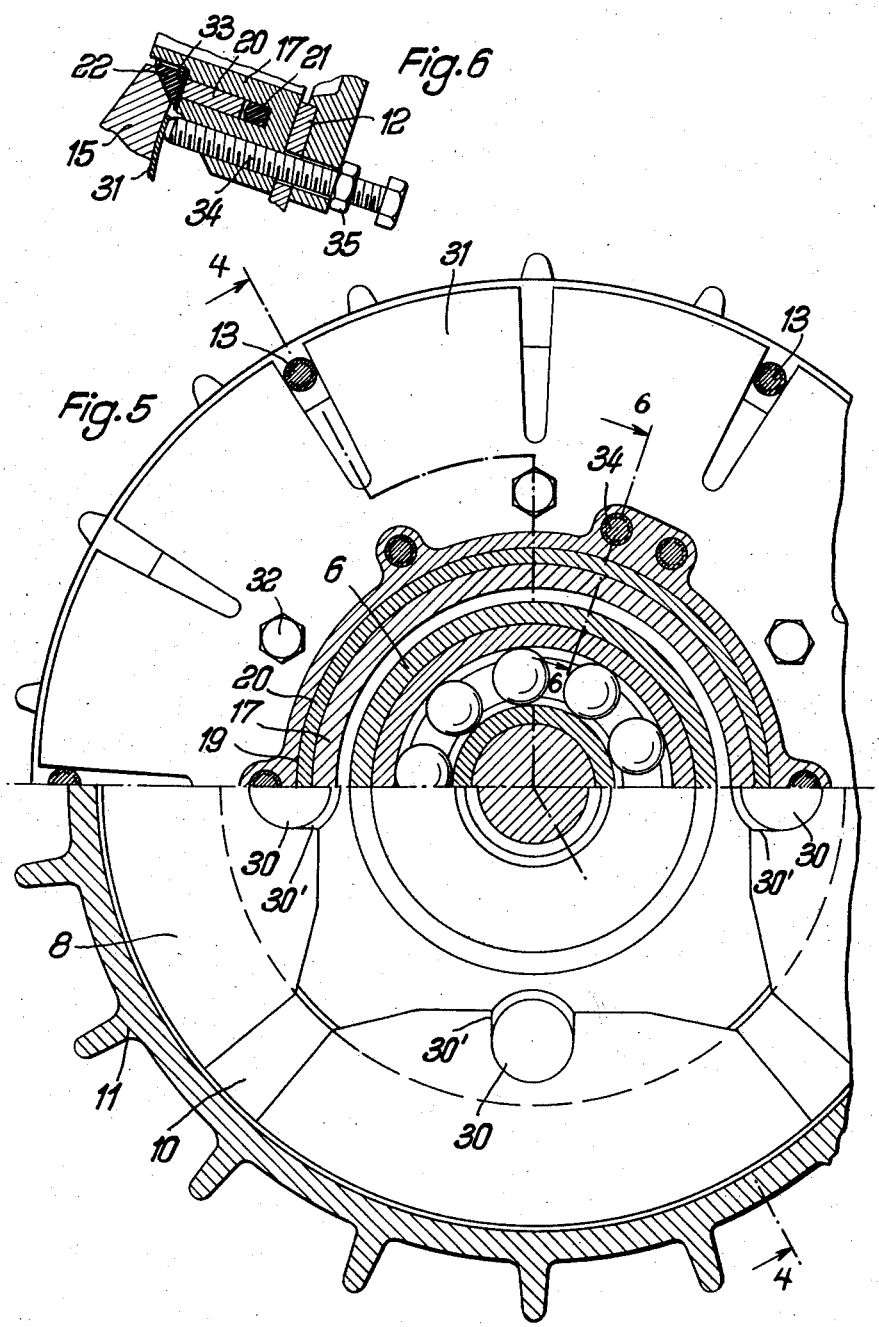

United States Patent Office 2,914,142
Patented Nov. 24, 1959

2,914,142
DISC BRAKES, PARTICULARLY FOR MOTOR VEHICLES

Hermann Klaue, Überlingen, Bodensee, Germany

Application April 24, 1957, Serial No. 654,864

Claims priority, application Germany June 7, 1956

4 Claims. (Cl. 188—72)

Disc brakes for vehicles are known, which are equipped with a rotating brake housing surrounding axially movable brake discs which are provided with a brake lining and which are pressed against the brake housing during braking. Brake discs have also been used already, wherein a rotating metal disc is embraced in a pincer-like manner by two brake segments which are urged hydraulically or mechanically against the rotating disc. The last-mentioned disc brake has the disadvantage, however, that the rotating disc is exposed to dirt from the outside and the specific load on this brake is even higher than in a friction brake of corresponding size. In the first-mentioned type of disc brake, the comparatively large rotating mass and the gap between the brake housing and the stationary portion, which is open towards the interior of the vehicle, are disadvantageous.

It is the object of the invention to provide a disc brake which is protected from dirt and which is suitable for heavy thermal stresses despite the enclosed brake discs.

According to the invention, this object is achieved as a result of the fact that rigidly connected to the cover of the stationary brake housing, which is housed in the cavity in the rotating wheel disc, is a hydraulically actuated brake-actuating ring which is mounted coaxial with the brake axis and the pressure ring of which is guided in an anular recess and is in frictional contact, through an insulating ring, with the side remote from the brake disc of a pressure plate which is mounted for axial displacement and by means of which the brake disc is pressed against the inner wall of the brake housing.

The pressure plate may be axially guided at its outer periphery by means of internal teeth on the brake housing and may be held in its neutral position by means of compression springs. It is also possible, however, to connect the pressure plate to the brake housing by means of a preferably slotted cup-spring disc which serves to transmit the braking force and for the automatic return to the neutral position.

If mechanical actuation of the brake is to be provided in addition to the hydraulic actuation, then it is possible to mount on the hydraulically actuated brake-actuating ring, by means of pairs of balls uniformly distributed round the periphery, a second brake-actuating ring which is pivotable in the circumferential direction and the balls of which are guided in cylindrical recesses and rest against a shoulder on the hydraulically actuated brake-actuating ring, and against circumferentially rising projections on the pressure plate.

In order to obtain satisfactory sealing against dirt between the rotating wheel disc and the stationary brake housing, it has been found useful to provide the latter, on the side facing the bottom of the wheel disc, with an annular sealing groove into which fits a dust-protection ring which is bent in at right angles and which rotates with the wheel hub.

Fig. 5 is an elevational view, partly in section taken on the line 5—5 of Fig. 4;

Fig. 6 is a fragmentary sectional view taken on the line 6—6 of Fig. 5; and

Figure 1:
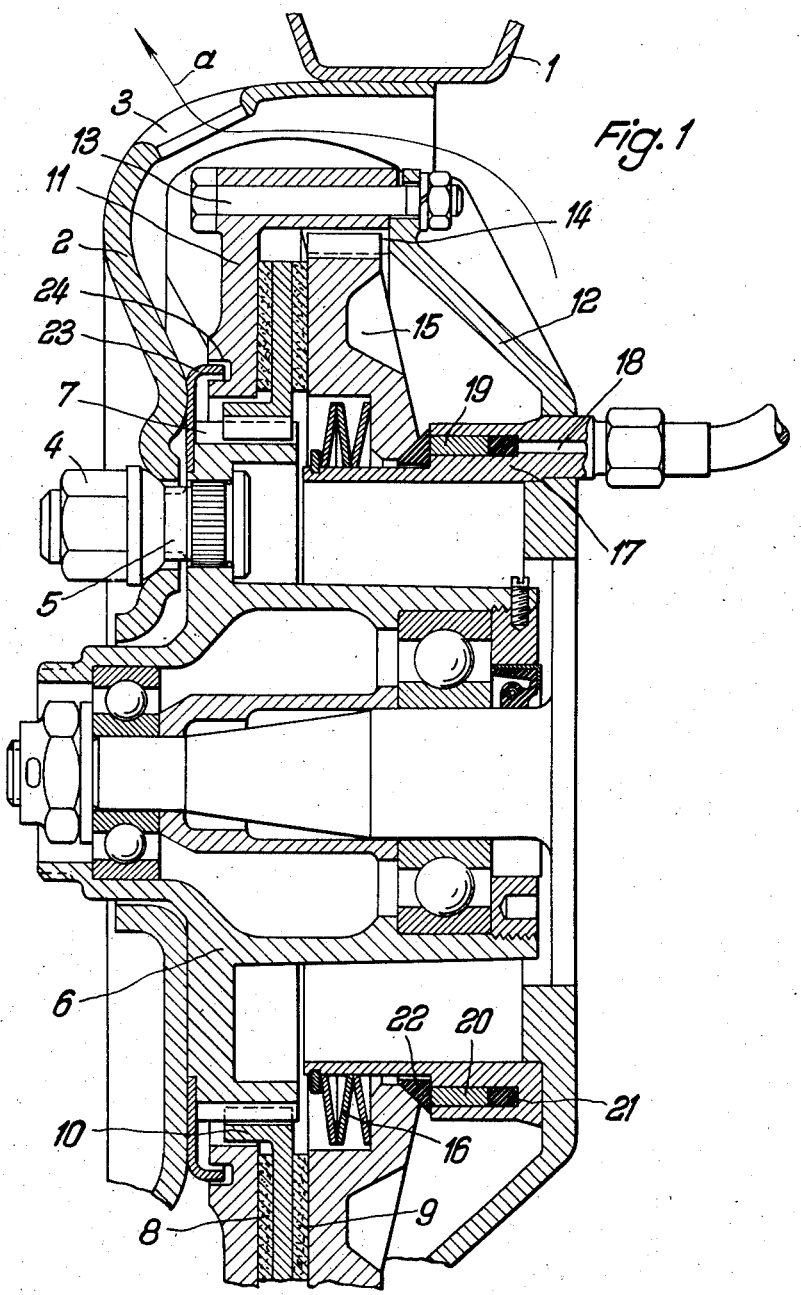
Fig. 1 is a fragmentary sectional view of a first embodiment of my invention.

The embodiment illustrated in Figure 1 will be described first. In this brake, the rim portion 1 is secured to the wheel disc 2. The latter comprises apertures 3 for the dissipation of the brake heat and is connected to the wheel hub 6 through the studs 5 by means of the hub nuts 4. On the outer diameter, the wheel hub 6 comprises teeth 7, on which the brake disc 10, which is provided with the brake linings 8 and 9, is mounted for free axial movement. The stationary brake housing 11, which is preferably constructed of cast iron with ribs, is bolted to the housing cover 12 by means of the bolts 13. The cover 12 is connected to the stationary portion of the vehicle, namely the body or the journal of the axle. The brake housing 11 comprises internal teeth 14 in which the pressure plate 15 is mounted for axial displacement. The latter is held in the neutral initial position illustrated by means of cup springs 16. It is advisable to make the teeth 14 as wide as possible because the heat is transmitted from the pressure plate 15 to the brake housing 11 through these teeth.

The actuation of the brake is effected by means of a hydraulically actuated actuating ring 17 which is bolted to the housing cover 12 and to which the brake oil is supplied through a conduit 18. It comprises an annular recess 19 in which is mounted a pressure ring 20, sealed by O-section ring 21. During the braking operation, this ring 20 exerts a pressure on the pressure plate 15 through an insulating ring 22 provided with a tapered outer surface. As a result, the brake disc 10 is gripped between said disc and the inner wall of the brake housing 11. Because of the insulating ring 22, the resulting brake heat cannot pass over to the hydraulically actuated brake-actuating ring.

The sealing of the brake housing 11 against dirt is effected by means of a ring 23 which is bent in at an angle and which fits into an annular recess 24 in the brake housing 11. The arrow $a$ indicates the air movement as the wheel rotates.

Figures 2, 3:
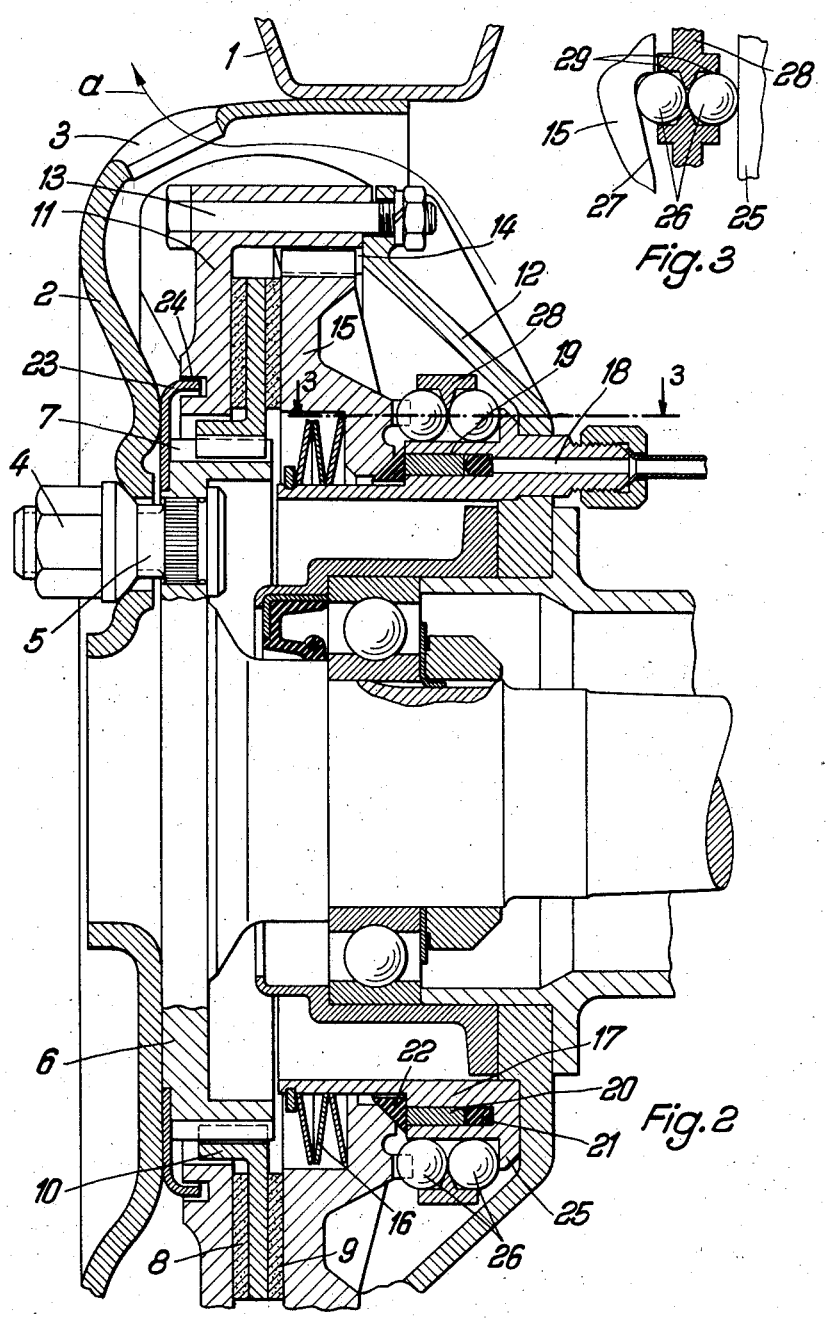
Fig. 2 is a fragmentary sectional view, similar to Fig. 1, but embodying a modification.
Fig. 3 is a fragmentary sectional view taken on the line 3—3 of Fig. 2.

The brake illustrated in Figure 2 comprises essentially the same parts as the brake in Figure 1. An additional mechanical actuating device is, however, provided. The hydraulically actuated actuating ring 17 comprises a shoulder 25 that forms a first guideway against which pairs of balls 26, equally spaced round the periphery, press during the mechanical actuation of the brake. On the opposite side, circumferentially rising projections 27 are provided on the pressure plate 15 that forms a second guideways for the balls 26.

Figure 3 shows that, as a result of turning the actuating ring 28, in the cylindrical recesses 29 of which are mounted the balls 26, the latter exert a pressure on the pressure plate 15 through the projections 27. This leads to a gripping of the rotating brake disc between the inner wall of the brake housing 11 and the brake disc 15. The turning of the ring 28 in the circumferential direction may be effected, for example, by means of a cable line. If this tension is relaxed, then the springs 16 urge the pressure plate 15 back into its neutral position.

Figure 4:
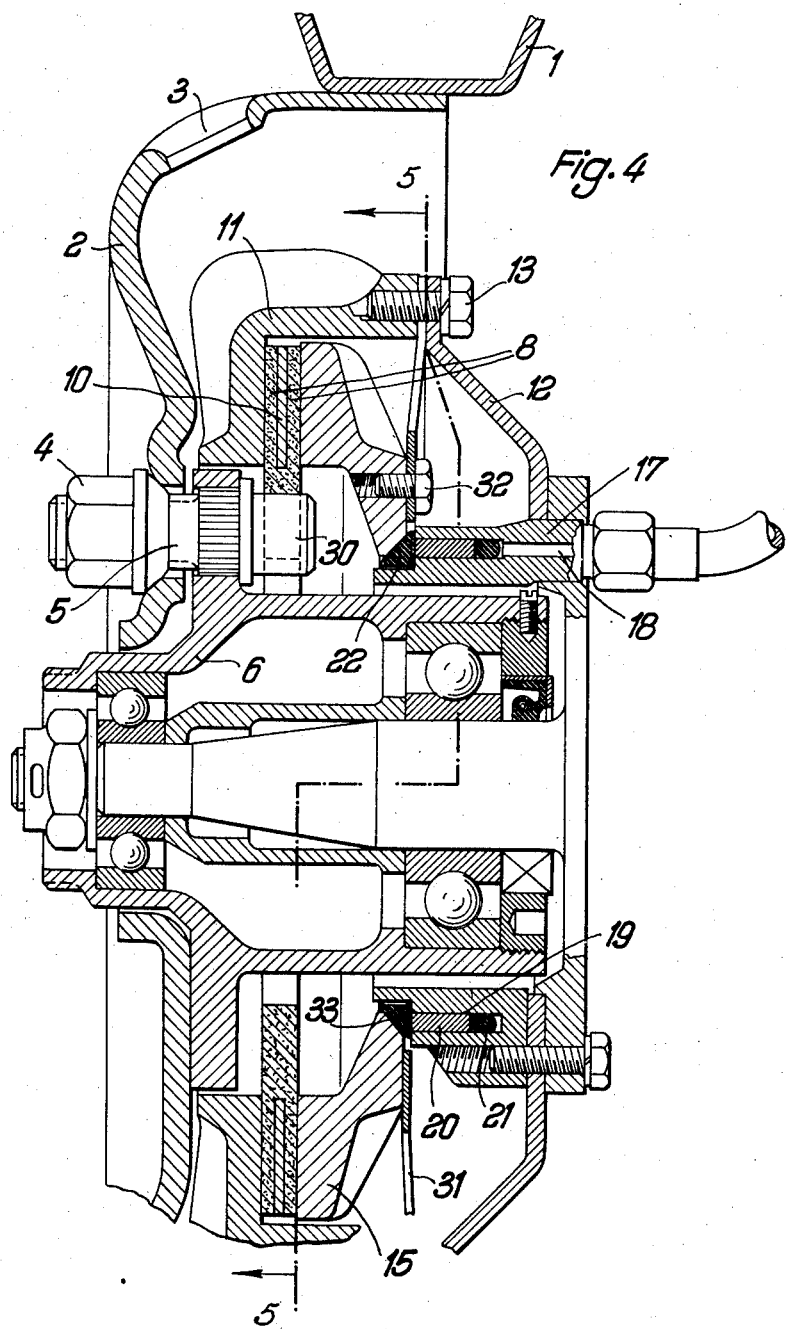
Fig. 4 is a fragmentary sectional view taken on the line 4—4 of Fig. 5, similar to Fig. 1 but embodying a further modification.

The third embodiment, illustrated in Figures 4, 5 and 6 is essentially similar to the example illustrated in Figure 1. The pressure plate 15 is now prevented from turning in the circumferential direction by means of a preferably slotted cup-spring disc 31 instead of by means of teeth 14. The spring disc 31 is secured, at its outer periphery, between the housing 11 and the housing cover 12. It is bolted to the pressure plate 15 by means of bolts 32. It serves not only to transmit the braking force from the pressure plate 15 to the brake housing 11 but also for the automatic return of the pressure plate 15 to the initial position after the completion of the braking operation.

The studs 5 are also constructed somewhat differently from the embodiment shown in Figure 1. They are provided with cylindrical extensions 30 on which the brake disc 10, which is provided with brake lining 8, is mounted for free axial movement by means of the recesses 30'.

A further minor structural difference between the embodiments in Figures 1 and 4 consists in the fact that an asbestos washer 33 is interposed between the pressure ring 20 and the ring 22 resting against the pressure plate 15. In this case, the ring 22 need not be made of insulating material.

Figure 6 shows how the brake is adjusted. For this purpose, two bolts 34, which are secured by lock-nuts 35, are mounted offset in the hydraulic ring 17. The air clearance in the brake may be varied by means of these bolts.

Figure 7:
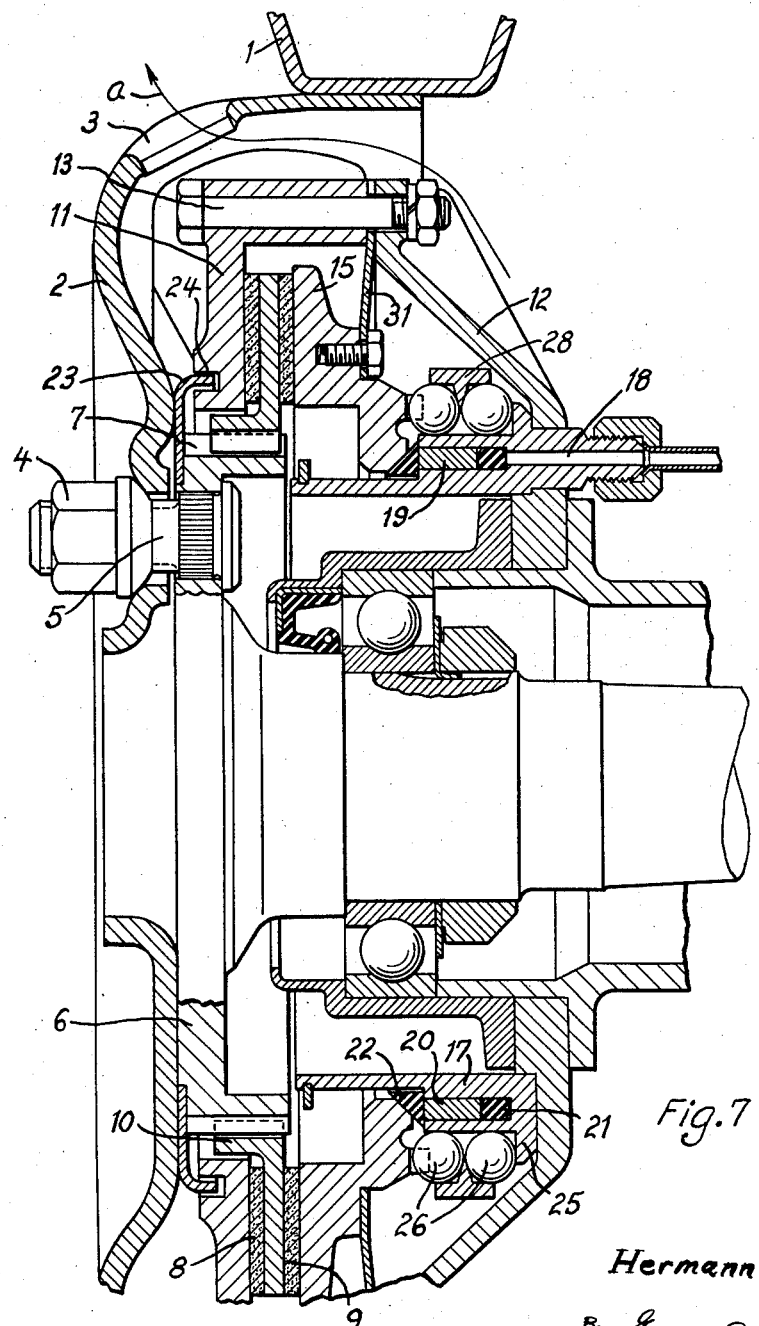
Fig. 7 is a fragmentary sectional view, similar to Fig. 1 but embodying a still further modification which unites some of the features of Figs. 2 and 4.

In the embodiment shown in Figure 7, there is provided the cup-spring or annular spring disc 31 as described in connection with Fig. 4, but it shows a hydraulic actuating device and an additional mechanical actuating device including the arrangement of the balls 26, of Figs. 2 and 3.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. A disc brake, for use in connection with the wheel brake of a vehicle having a rotatable wheel-carrying hub and a stationary closed brake housing surrounding said hub coaxially and having an internal brake surface, comprising in combination, a brake disc adapted to be disposed in said housing adjacent said brake surface and to be driven from said hub and to be rotating therewith and to be movable axially of said hub in opposite directions to and from said brake surface, a pressure plate adapted to be disposed in said housing adjacent said brake disc oppositely relative to said brake surface and being held non-rotating and being movable in opposite directions towards and from said brake surface, whereby when said pressure plate is moved in one direction the brake disc will be engaged between the brake surface and the pressure plate for braking and, respectively, when said pressure plate is moved in the opposite direction the brake disc engagement will be released, actuating means operable to move said pressure plate in said one direction, and an annular spring disc adapted to be disposed in said housing and to be connected near its outer edge to said housing, said annular spring disc being connected to said pressure plate and operable to restrain rotation of said pressure plate and to guide the pressure plate during its movements axially of the hub and urging said pressure plate in said opposite direction for brake release, said actuating means comprising mechanical means adapted to be disposed between said housing and said pressure plate and including two guideways, one of said guideways being adapted to be connected to said housing and the other to said pressure plate, at least one of said guideways including internal projections, a ring rotatably disposed between said guideways and being turnable relative to said guideways and having recesses, and balls disposed in said recesses, at least some of said balls being in rolling contact with one guideway and at least some of said balls in rolling contact with the other guideway, whereby the balls will spread apart the guideways upon rotation of said ring in one rotational direction to actuate the brake disc engagement.

2. In a disc brake, as claimed in claim 1, said actuating means comprising hydraulic means adapted to be disposed intermediate said housing and said pressure plate and actuatable externally of said housing.

3. In a disc brake, as claimed in claim 2, each of said hydraulic and mechanical actuating means being actuatable independently of the other from the exterior of said housing.

4. A disc brake, for use in connection with the wheel brake of a vehicle having a rotatable wheel carrying hub and a stationary closed brake housing surrounding said hub coaxially and having an internal brake surface, comprising in combination, a brake disc adapted to be disposed in said housing adjacent said brake surface and to be driven from said hub and to be rotating therewith and to be movable axially of said hub in opposite directions to and from said brake surface, a pressure plate adapted to be disposed in said housing adjacent said brake disc oppositely relative to said brake surface and being held non-rotating and being movable in opposite directions towards and from said brake surface, whereby when said pressure plate is moved in one direction the brake disc will be engaged between the brake surface and the pressure plate for braking and, respectively, when said pressure plate is moved in the opposite direction the brake disc engagement will be released, actuating means operable to move said pressure plate in said one direction, and an annular spring disc adapted to be disposed in said housing and to be connected near its outer edge to said housing, said annular spring disc being connected to said pressure plate and operable to restrain rotation of said pressure plate and to guide the pressure plate during its movements axially of the hub and urging said pressure plate in said opposite direction for brake release, said actuating means comprising mechanical means adapted to be disposed between said housing and said pressure plate and including two guideways, one of said guideways being adapted to be connected to said housing and the other to said pressure plate, at least one of said guideways including internal projections, a ring rotatably disposed between said guideways and being turnable relative to said guideways and having two adjoining rows of recesses, and balls disposed in two parallel series each in one of said rows, the balls of one of the series being in rolling contact with one guideway and the balls of the other series in rolling contact with the other guideway, and each ball of one series being in contact with a ball of the other series for pressure transmission, whereby the balls will spread apart the guideways upon rotation of said ring in one rotational sense to actuate the brake disc engagement.

References Cited in the file of this patent

UNITED STATES PATENTS

| | | |
|---|---|---|
| 2,014,348 | Woodward | Sept. 10, 1935 |
| 2,020,667 | Wahl | Nov. 12, 1935 |
| 2,024,093 | Crew | Dec. 10, 1935 |
| 2,109,648 | Poage et al. | Mar. 1, 1938 |
| 2,239,236 | Lambert | Apr. 22, 1941 |
| 2,245,988 | Lambert | June 17, 1941 |
| 2,466,990 | Johnson et al. | Apr. 12, 1949 |
| 2,581,941 | Skinn et al. | Jan. 8, 1952 |
| 2,589,291 | Sanford | Mar. 18, 1952 |
| 2,778,452 | Dasse | Jan. 22, 1957 |
| 2,780,323 | Cagle | Feb. 5, 1957 |

FOREIGN PATENTS

| | | |
|---|---|---|
| 167,254 | Great Britain | Aug. 2, 1921 |
| 510,037 | Great Britain | July 26, 1939 |